United States Patent
Washkurak et al.

(10) Patent No.: US 6,704,050 B1
(45) Date of Patent: Mar. 9, 2004

(54) ACTIVE-PIXEL IMAGE SENSING DEVICE WITH LINEAR MODE VOLTAGE TO CURRENT CONVERSION

(75) Inventors: William D. Washkurak, Acton, MA (US); Robert Daniel McGrath, Andover, MA (US); Joao Pedro Carreira, St. Maximin (FR)

(73) Assignees: Polaroid Corporation, Waltham, MA (US); Atmel Corporation, San Jose, CA (US)

( * ) Notice: Subject to any disclaimer, the term of this patent is extended or adjusted under 35 U.S.C. 154(b) by 0 days.

(21) Appl. No.: 09/298,158

(22) Filed: Apr. 23, 1999

(51) Int. Cl.[7] .................. H04N 5/335; H04N 5/217; H04N 5/228; H01L 27/00; H01L 31/062
(52) U.S. Cl. .............. 348/294; 348/241; 348/302; 348/222.1; 250/208.1; 257/292
(58) Field of Search ............... 348/294, 241, 348/243, 249, 222.1, 302, 308; 250/208.1; 257/291, 292, 268

(56) References Cited

U.S. PATENT DOCUMENTS

| | | | |
|---|---|---|---|
| 5,119,038 A | | 6/1992 | Anderson et al. .............. 330/2 |
| 5,461,425 A | | 10/1995 | Fowler et al. ............. 348/294 |
| 5,471,515 A | | 11/1995 | Fossum et al. ............. 377/60 |
| 5,488,415 A | | 1/1996 | Uno .......................... 348/241 |
| 5,539,457 A | * | 7/1996 | Tsunai ..................... 348/241 |
| 5,841,126 A | | 11/1998 | Fossum et al. ......... 250/208.1 |
| 5,886,659 A | * | 3/1999 | Pain et al. .................. 348/292 |
| 5,923,794 A | * | 7/1999 | McGrath et al. .......... 257/291 |
| 5,965,871 A | * | 10/1999 | Zhou et al. ............. 250/208.1 |
| 6,166,768 A | * | 12/2000 | Fossum et al. ............. 348/308 |
| 6,476,372 B2 | * | 11/2002 | Merrill et al. ........... 250/208.1 |
| 6,535,247 B1 | * | 3/2003 | Kozlowski et al. ......... 348/241 |

FOREIGN PATENT DOCUMENTS

| | | |
|---|---|---|
| EP | 0 845 900 A1 | 6/1998 |
| EP | 0 892 552 A2 | 1/1999 |
| JP | 09046597 | 2/1997 |
| JP | 09168117 | 6/1997 |

(List continued on next page.)

OTHER PUBLICATIONS

WIPO Publication, WO 95/32580 (Polaroid Corp.) Nov. 30, 1995.
WIPO Publication, WO 97/29587 (Polaroid Corp.) Aug. 14, 1997, p. 2, line 26, p. 7, line 16; Fig. 1, p. 7, line 17, p. 9, line 5; Fig. 2.
International Search Report, PCT/US 00/09954.
McGrath, F.D. et al: "FA 11.2: Current–Mediated, Current–Reset 768x512 Active Pixel Sensor Array", IEEE International Solid State Circuits Conference, U.S., IEEE, Inc. New York, Vol 40, Feb. 1, 1997, pp. 182–183, 452, XP000753062, ISSN: 0193–6530.

Primary Examiner—Andrew Christensen
Assistant Examiner—Nhan Tran (57) ABSTRACT

An image sensing device comprising active pixels is disclosed, each pixel having a charge accumulation region for collecting charges generated by a photosensitive element such as a photodiode. A linear voltage to current converter, current mirrors, and a differential amplifier generate an output signal and minimize fixed pattern noise and improve the signal to noise ratio. Image quality is improved by reducing pixel blooming and image smearing through an improved method for resetting the pixels with a bias voltage reference which is less than Vdd. Active circuitry and physical device layout reduce the effects of IR voltage drops along the bus lines in a massive pixel array.

22 Claims, 6 Drawing Sheets

FOREIGN PATENT DOCUMENTS

| | | |
|---|---|---|
| JP | 09172577 | 6/1997 |
| JP | 10013746 | 1/1998 |
| JP | 10028240 | 1/1998 |
| JP | 10065971 | 6/1998 |
| JP | 10164442 | 6/1998 |
| JP | 10173997 | 6/1998 |
| JP | 10178167 | 6/1998 |
| JP | 10178546 | 6/1998 |
| JP | 10178588 | 6/1998 |
| JP | 10178589 | 6/1998 |

* cited by examiner

ACTIVE-PIXEL IMAGE SENSING DEVICE WITH LINEAR MODE VOLTAGE TO CURRENT CONVERSION

FIELD OF THE INVENTION

This invention relates to solid state electronic imaging devices and, more particularly, to active pixel image sensing devices having improved image quality and fabricated using a CMOS process.

BACKGROUND OF THE INVENTION

Image sensing devices which operate by performing the steps of sensing incident optical radiation, converting the radiation into charge carriers, and storing the charge carriers in photosensitive material are known in the art. Most conventional image sensing devices are based on charge-coupled device (CCD) technology. Fabricating a CCD-based imager requires a number of specialized manufacturing operations as compared to fabricating other commonly used semiconductor components. Moreover, a CCD-based imager utilizes nonstandard voltages with respect to voltages used by other commonly used semiconductor components necessitating a complex power supply and associated distribution circuitry. These requirements increase the difficulty of integrating circuits employing CCDs into an electronic system and increase the complexity of the fabrication process.

Certain design and fabrication difficulties associated with CCD-based image sensing devices can be overcome with an imager having pixels made from CMOS transistors and fabricated using a CMOS process. However, voltage threshold variations among CMOS devices, on the same substrate, make it difficult to achieve uniform and precise resetting of pixels, and produce fixed-pattern noise in the output signal. A CMOS based image sensing device in which fixed pattern noise attributable to pixel-to-pixel voltage threshold variation is substantially eliminated is desirable. A reduction in fixed pattern noise is directly related to an improved signal to noise ratio (Signal/Noise).

Some known CMOS image sensing devices operate in a current mode and incorporate current mediated pixels, reset the pixels with a current reference and generate a current output. Correlated double sampling, a technique which measures both a reference value and a signal value, can be used to reduce fixed pattern noise. Unfortunately, the reduction of fixed pattern noise is limited due to the non-linear quadratic current mode transfer function of current mode pixels. Other known CMOS image sensing devices use an active pixel operating in a voltage mode including a photo diode, a reset switch, an active device, a row select transistor, and an output select transistor. The voltage mode pixel is reset with a reference voltage and generates a voltage signal as an output. These known devices reset the voltage on the active pixels to the $V_{dd}$ supply voltage which causes the pixels to exhibit a smeared image when imaging a moving object due to a partial signal which lags on a pixel from a previous frame. This effect is referred to as lag. Known devices are also subject to blooming which is an image quality artifact caused by excess charge from high illumination on one pixel spilling over onto neighboring pixels. Some prior art devices use a source follower voltage output but can not effectively eliminate fixed pattern noise. Other known devices use voltage signals on the output bus but require more power to operate at an equivalent speed performance level compared to the present invention. An additional disadvantage to using voltage signals on the output bus is the requirement for more precise capacitors in the output amplifier circuitry. More precise capacitors require fabrication process enhancements typically adding additional manufacturing steps. There is a need in the art for CMOS imaging devices with improved image quality including improved signal to noise ratio.

SUMMARY OF THE INVENTION

It is an object of the present invention to provide a solid-state imaging device including a large array of pixels which can be fabricated using a CMOS process and which yields a signal with lower levels of fixed-pattern noise caused by pixel-to-pixel variation in operating parameters including voltage variations on the column and output busses.

It is a further object of the present invention to provide a highly linear voltage to current converter which allows the use of correlated double sampling to minimize fixed pattern noise.

It is another object of the present invention to improve image quality by controlling the pixel reset process in order to reduce image smearing caused by lag of a partial on a pixel between fields and to reduce pixel blooming artifacts due to the generation of excess photo carriers in the presence of high levels of illumination.

In accordance with the present invention, the foregoing objectives are achieved by an image sensing device including one or more pixels with CMOS components in which a pixel bias reference voltage is utilized to reset the pixels instead of the $V_{dd}$ supply voltage and a linear voltage to current converting circuit with bus voltage independent biasing. The image sensing device further includes active pixels operated in a voltage mode to produce a pixel output voltage which contributes to the output signal using a source follower amplifier; a level shifter to shift the output voltage level to a higher voltage, a coupling device which is periodically clamped to generate a reference current and to couple the higher voltage to a buffer device. The output of the buffer drives a linear mode current controlling device which is biased to linearly convert the voltage input into a current which is stored in a current mirror. With such an arrangement, the conversion of a massive array of pixels occurs in a manner which reduces additional noise and signal variation due to IR drops along the row and column output busses. Additionally, the image sensing device includes a reference current mirror which stores a reference current which is proportional to a predetermined clamp voltage and a signal current mirror which stores a signal current which is indicative of the output voltage signal from the active pixel. Both the reference current mirror and the signal current mirror supply current inputs to a differential amplifier to remove most of the fixed pattern noise from the output signal.

In accordance with the present invention, the foregoing objectives are achieved by a method of converting an output voltage from an active pixel in an image sensing device into a current including the steps of: providing a bias voltage for biasing a linear mode current controlling device into a linear mode; periodically clamping an input to a buffer device to a predetermined clamp voltage; shifting the output voltage level to a higher voltage; coupling the higher voltage to the buffer device; generating an output signal from the buffer device for controlling the linear mode current controlling device; and generating a current signal flowing through the linear mode current controlling device which is indicative of the output voltage from the active pixel.

BRIEF DESCRIPTION OF THE DRAWINGS

These and other features of the invention are more fully set forth in the detailed description and drawing of which.

DESCRIPTION OF THE PREFERRED EMBODIMENTS

Figure 1:
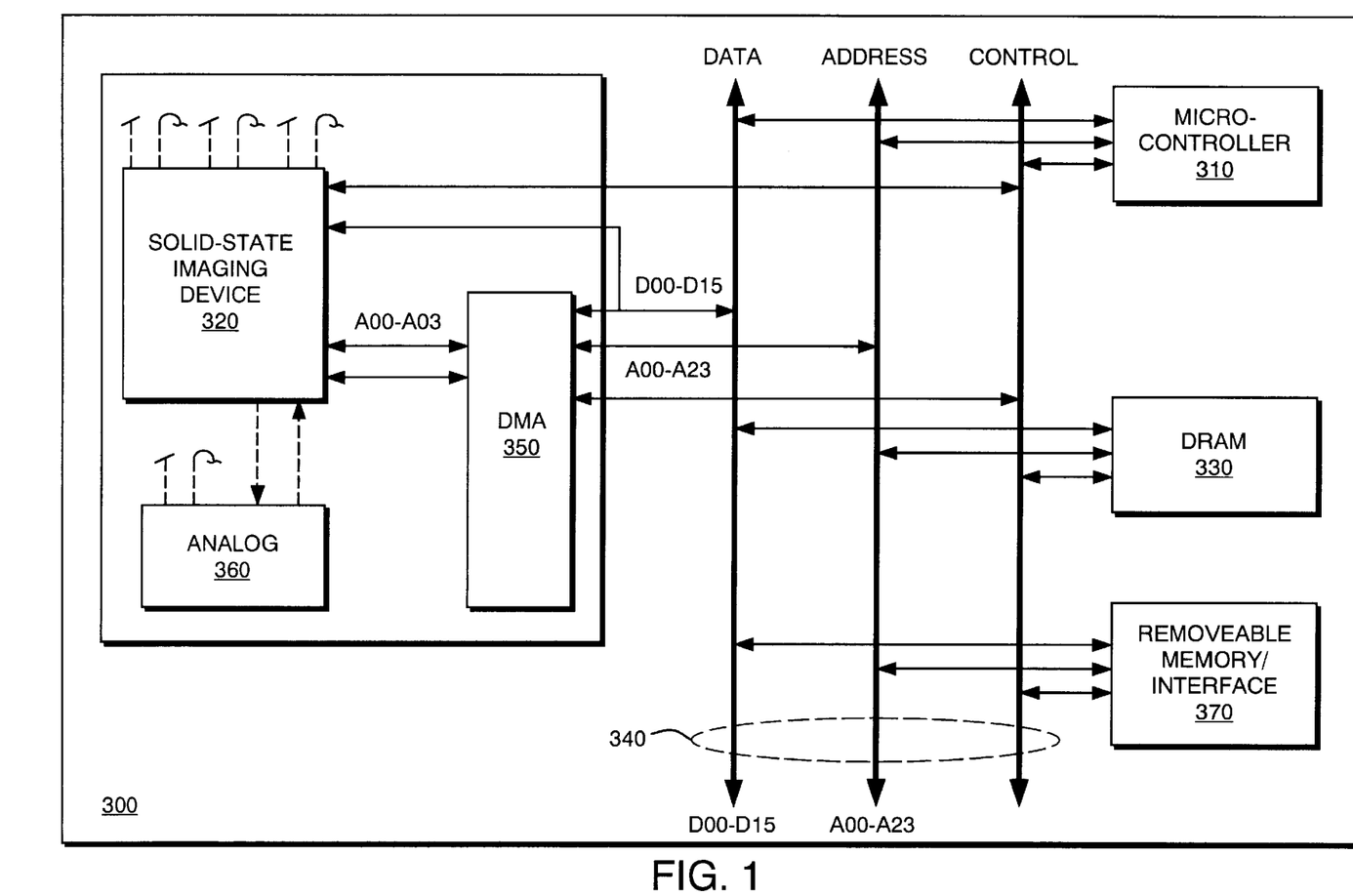
FIG. 1 is a system block diagram of an embodiment of the image acquisition system including a solid-state imaging device, micro-controller, memory, and removable memory/interface circuit.

In brief overview and referring to FIG. 1, the overall architecture of an embodiment of an image acquisition system 300 is shown including a micro-controller timing and control circuit 310, a solid-state imaging device 320, memory 330, an address, data and control bus 340, DMA control circuitry 350, analog processing circuitry 360, and removable memory/interface circuit 370. As is known in the art, the micro-controller timing and control circuit 310 communicates with memory 330, a removable memory and interface circuitry 370, DMA control circuitry 350, and the solid-state imaging device 320 by means of address, data and control bus 340. Analog processing circuitry 360 communicates with the solid-state imaging device 320 to provide analog processing of signals supplied to and generated from the solid-state imaging device 320.

Figure 2:
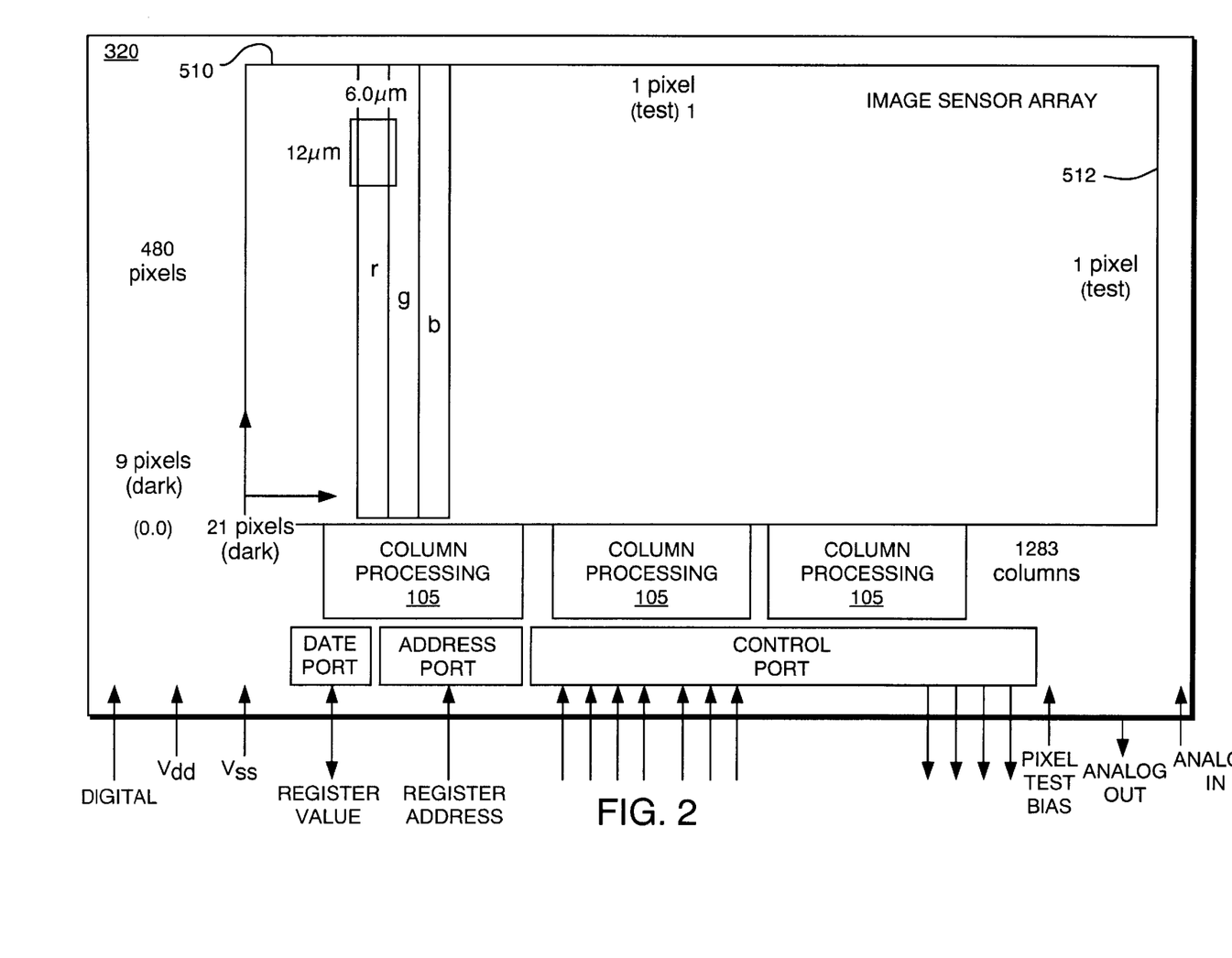
FIG. 2 is an overview of the solid-state imaging device according to the present invention including an image sensor array with a test row and test column, and control signals and circuitry.

FIG. 2 shows some additional details of the solid-state imaging device 320 including an array of pixels arranged by rows and columns having a test row 510 and a test column 512. The test row 510 and test column can be connected to an external analog voltage for testing the device. In a preferred embodiment, the solid-state imaging device 320 as shown contains three arrays of 1305 columns (1283 active columns, 21 dark columns and 1 test column) by 490 rows (480 active rows, 9 dark rows and 1 test row) organized for each of the primary colors (red, green and blue). The analog signals on the three color analog output busses are digitized and merged into a digital three byte color pixel.

Figure 3:
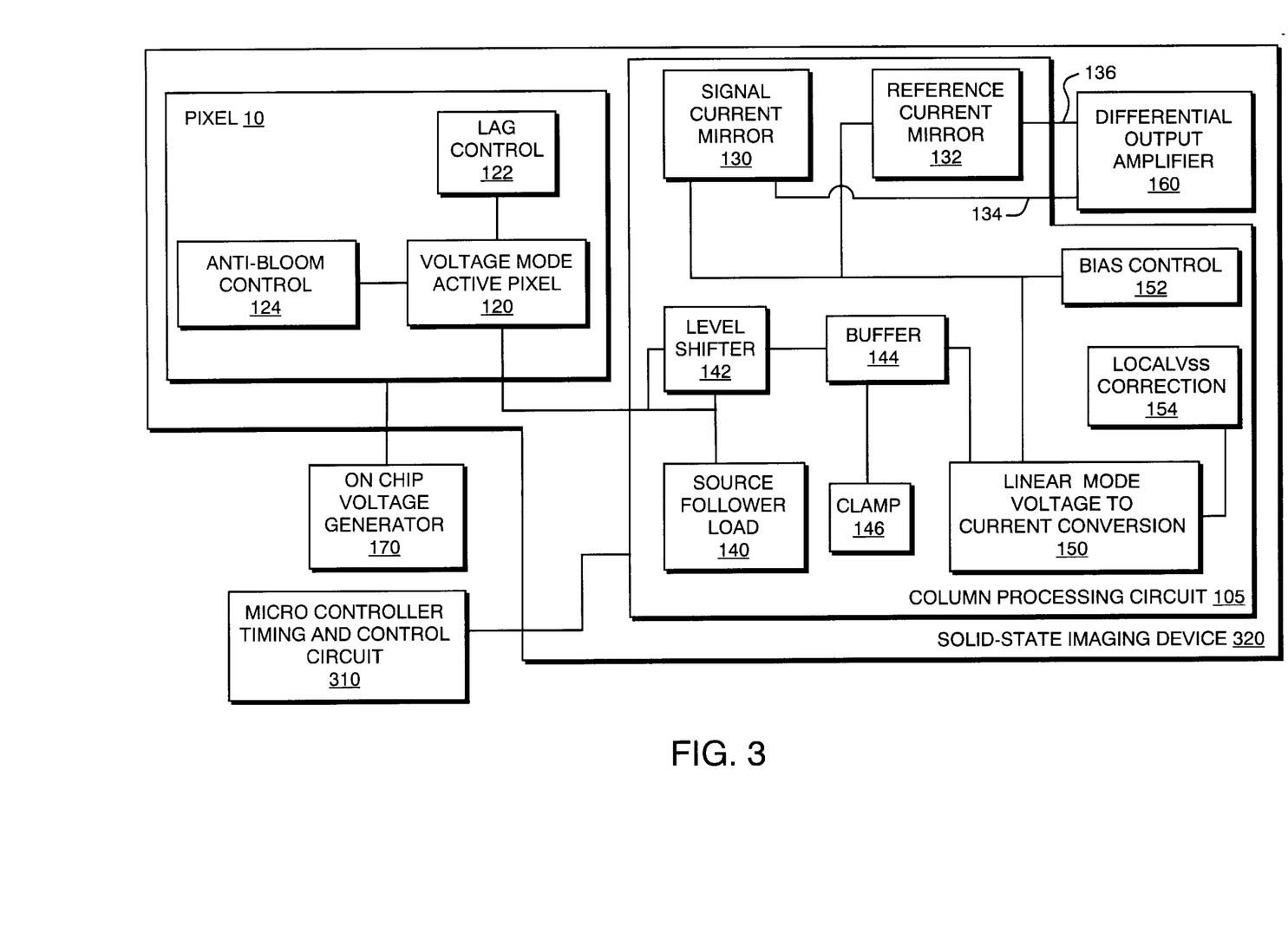
FIG. 3 is a functional block diagram of the image acquisition device according to the present invention.

Referring to FIG. 3, the overall operation of the present invention is shown in a block diagram of the image acquisition array. Ambient light received through the optics of a camera (not shown), a fingerprint scanner (not shown), or any other image acquisition system generates photo carriers in the light collecting areas of each pixel 10. The micro-controller timing and control circuit 310 selects a subset of pixels from the rows and columns according to the addressable array parameters supplied to the micro-controller timing and control circuit 310.

As pixel 10 is exposed to ambient light during the exposure period, the voltage on the active pixel is reduced in proportion to the ambient light signal. The reduced voltage on the voltage mode active pixel 120 is further lowered by the operation of a source follower and row select switch. The lower voltage signal on a source follower load 140 is level shifted by level shifter 142 to a higher voltage and communicated to a buffer 144 which controls a linear mode voltage to current conversion 150 (hereinafter referred to as the linear V-I conversion 150). Periodically, clamp 146 sets the input to a buffer 144 to a predetermined voltage as each row is processed.

While the input to the buffer 144 is clamped, the linear V-I conversion 150 transforms the voltage signal on the buffer 144 into a reference current, proportional to the predetermined clamp voltage $V_{clamp}$, that is stored in the reference current mirror 132. After the clamp is released, the voltage mode active pixel 120 is reset. The reset operation causes a voltage signal to appear on the buffer which is derived from the signal output voltage on the selected pixel 10. The linear V-I conversion 150 transforms the voltage signal from the buffer 144 into a current signal that is stored in signal current mirror 130. The voltage mode active pixel 120 is reset in a process which reduces lag through lag control 122 and blooming through anti-bloom control 124 by using voltages other than $V_{dd}$ and $V_{ss}$ which are derived on the substrate by an on chip voltage generation 170. The clamping and reset operation occurs in parallel for each pixel in a selected row. Finally the micro-controller timing and control circuit 310 scans each pair of current mirrors sequentially for each selected column to generate an output signal for the selected row. The subset of the pixels 10 in the solid-state imaging device 320 to be scanned is controlled by the micro-controller timing and control circuit 310. The micro-controller timing and control circuit 310 controls the conversion of the stored currents signals in the signal current mirror 130 and the reference current mirror 132 into a reference current and a signal current which are communicated via the signal output bus 134 and the reference output bus 136 as a current signals connected to the inputs of the differential output amplifier 160.

The pixels in each row are processed in parallel in each column by a column processing circuit 105, and the signals from each pixel 10 are multiplexed on signal and reference column output busses 134, 136 into the differential output amplifier 160 to produce an output signal for the selected row. The differential output amplifier 160 subtracts the reference signal stored in the reference current mirror 132 from the signal in the signal current mirror 130.

The output currents of the two current mirrors are subtracted by the differential amplifier 160 to produce an output current $I_{diffampout}$, proportional to the signal $V_{signal}$ received by the pixel 10. The use of current signals on the column output busses 134, 136 is less susceptible to noise than voltage signals and uses less power for a selected bus speed. The micro-controller timing and control circuit 310 can scan the entire array or can process a subset of rows and columns. A local $V_{ss}$ correction 154 ensures that the linear V-I conversion 150 operates in a linear mode independent of the column processing circuit 105 individual element's physical position on the power bus. The local $V_{ss}$ correction 154 for each column handles the voltage change along the $V_{ss}$ bus by initially applying a bias voltage to bias control 152 before power is applied to the column processing circuit 105. When power is applied, the bias voltage adjusts locally to track the change along the $V_{ss}$ bus. A bias control 152 provides a bias voltage to enable the linear V-I conversion 150 to operate in a linear mode after power is applied to the column processing circuit 105.

The image quality improvements in the imaging devices of the present invention are characterized by imaging devices and methods which reduce smearing caused by signal lag between frames, pixel blooming and fixed pattern noise. The imaging devices according to the present invention operate in a voltage mode having a voltage reference, a voltage output, and a linear voltage to current converter for reducing fixed pattern noise and improving the signal to noise ratio. Pixel operation in the present invention differs in two ways from known imaging devices. First, although the same transistor functions are used, the operation of the transistors in the present invention differs in respect to the bias voltages and the method of resetting the pixel 10. Secondly, known devices teach using dark frames to determine reference levels or to store a reference and signal charge on capacitors to reduce fixed pattern noise. The present invention uses a two sage correlated double sampling technique to reduce fixed pattern noise. Two stage correlated double sampling maintains linearity in the conversion of the pixel output signal before and after the V-I conversion by periodically clamping the input to the linear V-I conversion 150 to an optimal voltage and storing a reference current when the input is clamped and storing a current value reflecting the signal value when the pixel 10 is reset. In a preferred embodiment, the optimal voltage is set to $V_{ss}$.

Figure 4:
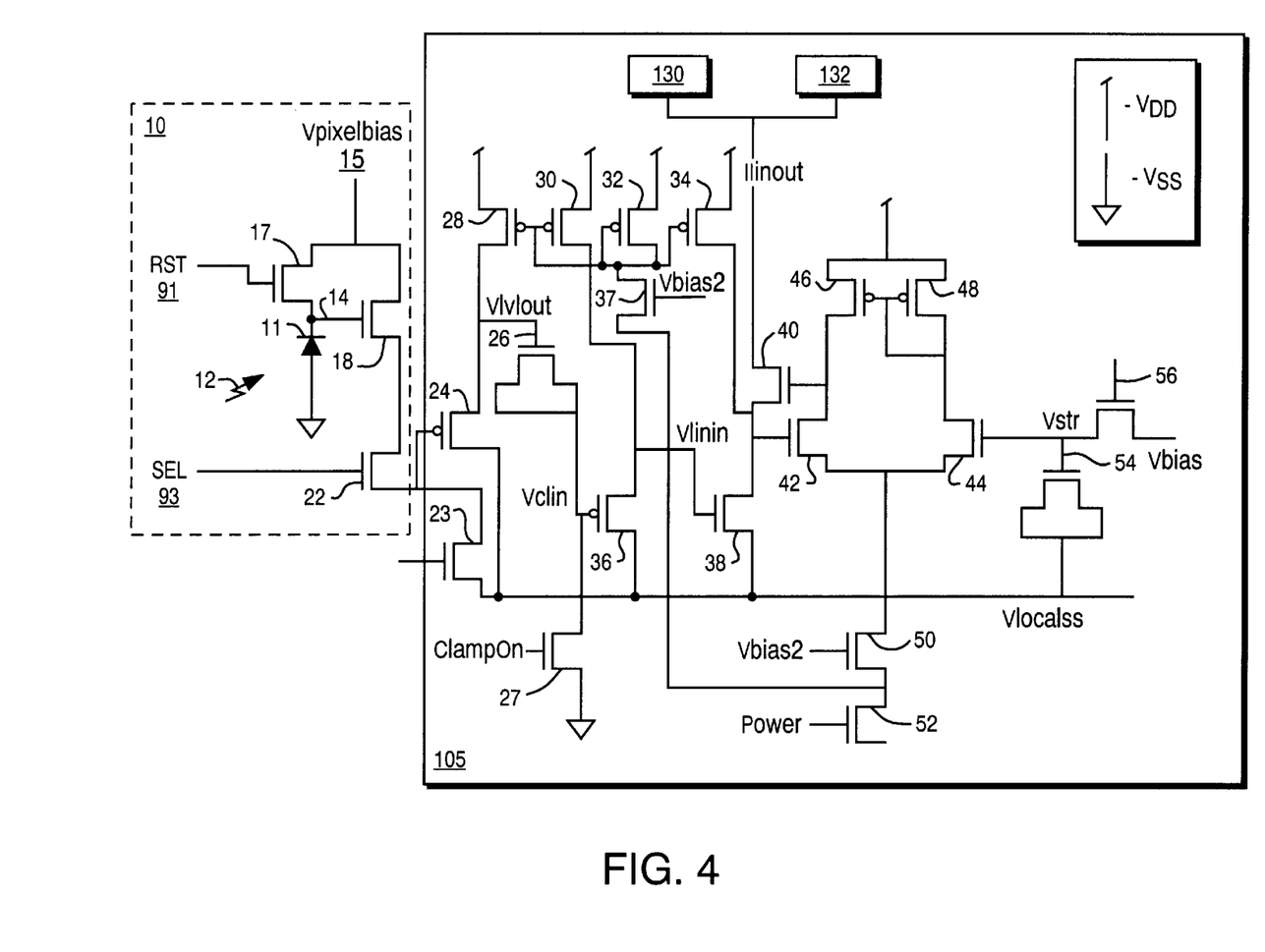
FIG. 4 is a block diagram of an image sensing array according to the present invention including an active pixel and column processing circuitry.

Referring now to FIG. 4, there is shown a simplified electrical schematic of an active pixel 10 and associated column processing circuit 105 according to the preferred present invention. The active pixel 10 includes an nMOS transistor reset switch 17, an nMOS transistor source follower 18, and an nMOS transistor row select switch 22. The source of the reset switch 17 is connected to the gate of the source follower 18 and to a photodiode cathode 14 of photodiode 11. The reset switch 17, the source follower 18, the row select switch 22 and the photo diode 11 are reproduced in every pixel and the signal lines which enter the pixel are a reset line RST 91 and a pixel row select line SEL 93 and power sources $V_{pixelbias}$ and $V_{ss}$. The voltage output of the active pixel 10 is communicated to the drain of an NMOS transistor source follower load 23 and the gate of a pMOS transistor level shifter 24. The output of the level shifter 24 is coupled through a coupling device 26, formed from a nMOS transistor, to the gate of a pMOS transistor buffer 36. The gate of the buffer 36 is also connected the drain of a clamp 27. The source of the buffer 36 is connected to the gate an nMOS transistor linear mode current controlling device 38.

An active circuit including nMOS transistors 42 and 44 and pMOS transistors 46 and 48, for maintaining a biasing voltage across the linear mode current controlling device in the presence of a voltage drop along the bus, is connected to the drain of the linear mode current controlling device 38 and the gate of a bias adjuster 40 nMOS transistor. The active circuit for maintaining a biasing voltage across the linear mode current controlling device in the presence of a voltage drop along the bus is also connected to a capacitor 54, formed from an nMOS transistor which is connected to the local bus providing $V_{ss}$ supply and also connected to switch 56 which provides $V_{bias}$ as a reference bias voltage.

The gate terminals of bias supply pMOS transistors level shifter bias 28, buffer bias 30, diode bias 32 and shunt bias 34 are connected to a bias sink 37 which is connected to a power switch 52. The drain of bias supply transistor shunt bias 34 is connected to the gate of the active circuit nMOS transistors 42, the source of the bias adjuster 40 and the drain of the transistor linear mode current controlling device 38.

The column processing circuit 105 is replicated once per each column. $V_{dd}$ is used in the column processing circuit 105 but the present invention does not require that $V_{dd}$ be used in the pixel 10. A plurality of active pixels constitutes each row of the solid-state imaging device 320.

Pixel Reset Operation

During the operation of the solid-state imaging device 320, the pixel 10 is reset to a predetermined voltage $V_{pixelbias}$ after exposure and signal readout. The on chip voltage generation 170 provides a reference voltage 15 $V_{pixelbias}$ to reset pixel 10. In a test row 510 and a test column 512 the drain of reset switch 17 is connected to an input connection on the substrate that can be connected to an external voltage. If selected for readout by the micro-controller timing and control circuit 310, the test pixels can be used to test various aspects of the image acquisition system 300 without having to optically provide a precise illumination signal on selected pixels. Image sensing is accomplished by acquiring incident optical radiation 12 and thereby producing a change in the electronic characteristics of pixel 10. In an embodiment of the present invention, the reference voltage 15 for each active pixel 10 to be scanned is set to $V_{pixelbias}$, approximately 2.7 volts. $V_{pixelbias}$ is derived from $V_{dd}$ and is set to a voltage lower than $V_{dd}$ which is approximately 3.3 volts in a preferred embodiment having a 0.5 micron process geometry. This reference voltage being less than $V_{dd}$ provides a faster reset without lag since the process for resetting to $V_{pixelbias}$ is a very quick process because when the reset transistor is turned on by taking it high there is a channel of charge formed under the transistor and the resistance of this transistor is very low causing the voltage on the photodiode cathode 14 to quickly stabilize to $V_{pixelbias}$. If $V_{pixelbias}$ is greater than $V_{dd}-V_{threshold}$, the channel under the transistor has very few carriers and a high resistance as the voltage on the photodiode cathode 14 exceeds $V_{dd}-V_{threshold}$ and it may take a longer time for the voltage to stabilize than is available causing lag due to charge from a previous frame affecting the level of the voltage set on the pixel. Unlike the operation of a current mode pixel where a large reset current would be required, operating the array of pixels in a voltage mode allows each pixel to be reset simultaneously to reference voltage 15 $V_{pixelbias}$.

The reset signal RST 91 is applied to the gate of the reset switch 17 and is clocked between $V_{dd}$ and $V_{resetoff}$. When the reset signal RST 91 is applied to the gate of the reset switch 17 the transistor is switched on and the reference voltage 15 set to $V_{pixelbias}$ is applied to the photodiode cathode 14. The reset switch 17 is switched off when $V_{resetoff}$ is applied to the gate of the reset transistor. $V_{resetoff}$ is a voltage which is greater than $V_{ss}$. The channel formed in reset switch 17 acts as a lateral anti-blooming drain. The reset switch 17 provides the lateral anti-blooming drain because the channel potential is less than $V_{dd}$ and greater than $V_{ss}$ leaving a path for the excess charge, photoelectrons, to flow if the incident radiation saturates the photo diode 11. In the absence of this channel, an extremely bright light source would generate an excess charge, the photo diode 11 will collapse, and the photo carriers will diffuse through adjoining pixels 10 causing blooming. In a preferred embodiment the $V_{resetoff}$ voltage is set to 0.8 V which creates a channel which will drain the excess charge and prevent the photodiode 11 from being forward biased. In a preferred embodiment, $V_{pixelbias}$ can also be tied to the drain on the source follower 18 to simplify the pixel 10 layout by eliminating the need to additionally bring $V_{dd}$ supply into each pixel without a significant loss in performance. The reduced voltage allows the reset operation to occur rapidly and reduces any memory effect from the signal in a previous field. The source follower 18 turns off when the voltage at the photodiode cathode drops to $V_{threshold}$ (approximately 1 volt) above Vss. The reduced lag and anti-blooming improvements require extra voltage supplies which are generated on the device by using the on chip voltage generation 170. $V_{pixelbias}$ is a voltage drop from $V_{dd}$. $V_{resetoff}$ and other bias voltages are referenced to ground. This allows $V_{pixelbias}$ to float relative to $V_{dd}$ which can vary plus or minus 10 percent. The on chip voltage regulation 170 generates the voltages used to reset each pixel, $V_{pixelbias}$ and $V_{resetoff}$. In a preferred embodiment $V_{pixelbias}$ is approximately 2.3 volts. Prior art CMOS devices use only $V_{dd}$ and $V_{ss}$, and it was a manufacturing liability in dedicated image sensors to use additional voltages. The level of integration of the present invention facilitates the creation of other voltages on the substrate either derived directly from $V_{dd}$ or relative to $V_{ss}$.

In an alternate embodiment a PMOS transistor can be used as the reset switch and $V_{dd}$ could be used to reset the pixel without any lag effect. There would be a fabrication disadvantage using a pMOS reset transistor, but there would be advantage because $V_{dd}$ could be used as the reference voltage.

Active Circuit to Maintain Linear Mode Operation under Changes in Local Vss

It is important that the voltage across the source and drain of the linear mode current controlling device 38 be low enough to cause the linear mode current controlling device 38 to operate in a linear range. In a preferred embodiment the bias voltage across the linear mode current controlling device 38 is $V_{bias}$ approximately 0.6 volts. By keeping the voltage across the linear mode current controlling device 38 constant and keeping the source of the linear mode current controlling device 38 close to $V_{sslocal}$ the linear mode current controlling device 38 operates in a linear mode so that the current flowing through the linear mode current controlling device 38 is linearly dependant on the voltage on the gate of the linear mode current controlling device 38. An active circuit measures the local value of $V_{ss}$ before power is applied to the column processing circuit 105 and the bias current flowing through the linear mode current controlling device 38 is corrected when power is applied to the column processing circuit 105 thereby operating all the linear mode current controlling devices 38 in the array for each column under the same bias operating conditions.

Before the column processing circuit 105 is powered on and current begins to flow in this circuit, the microcontroller timing and control circuit 310 clamps the capacitor formed by the nMOS transistor (a large 12 by 12 $\mu m^2$ CMOS transistor) 54 across the local $V_{ss}$ voltage, $V_{sslocal}$ and $V_{bias}$ linking $V_{str}$ to the local $V_{ss}$ voltage. This sets the voltage on the gate of transistor 44 to $V_{bias}$ volts above $V_{sslocal}$.

The process of converting a row of exposed pixel signals into an output signal begins by applying the POWER signal to the gate of the power switch 52, which acts as a power switch turning on the column processor circuitry. The resulting IR change along the $V_{ss}$ rail from current flow along the bus causes changes in the local values of $V_{ss}$ along the rail.

The changes in the local $V_{ss}$ voltage are corrected by the active circuit formed by nMOS transistors 42, 44, 46, and 48. The goal is to maintain $V_{bias}$ on the gate on transistor 42 and then to maintain a constant voltage across the linear mode current controlling device 38. When power is turned on in the column processing circuit 105, switch 56 is turned off leaving the gate of transistor 44 charged up to $V_{str}$ which will track $V_{sslocal}$ as a result of capacitor 56. The active circuit formed by transistors 42, 44, 46, and 48 forces $V_{str}$ to be mirrored on the drain of the linear mode current controlling device 38. If the drain voltage on the linear mode current controlling device 38 tries to deviate from $V_{str}$ then there is a current mismatch through transistor 42 and transistor 44 which changes the bias on the bias adjuster 40. The bias adjuster 40 functions as a control element to force to voltage on gate of transistor 42 to be constant and to match on $V_{bias}$. This method of operation will maintain the correct biasing voltage across the linear mode current controlling device 38 in the presence of voltage changes along the $V_{ss}$ rail.

Pixel Operation, Power On and Bias Generation

Bias voltage, $V_{bias2}$ is applied to the gate of nMOS bias sink transistor 37 forming a 10 microamp current source after being switched on by the power switch 52. After the bias sink 37 turns on, transistors diode bias 32, shunt bias 34, buffer bias 30, and level shifter bias 28 turn on to provide bias current to the column processing circuit. Diode bias 32 sets the voltages for the set of current sources. The level shifter bias 28 provides bias current for the level shifter 24, and the buffer bias 30 provides bias current to the buffer 36. The shunt bias 34 provides bias current for maintaining the linear mode current controlling device 38 in a linear region in the presence of high ambient light.

Shunt bias 34 provides a bias current offset of approximately 30 to 50 microamps to provide sufficient current through the linear mode current controlling device 38 to maintain linearity in the presence of high ambient light (low voltage signal levels.) Shunt bias 34 forces current into drain of the linear mode current controlling device 38 with the purpose of offseting the current which comes out of the bias adjuster 40 in an amount supplied by shunt bias 34. This step reduces the amount of current flowing out of the signal current mirror 130 and the reference current mirror 132, and thereby maintains linear operation.

Active Pixel Image Sensing Device Exposure

The reset switch 17 is opened to isolate the gate terminal of the source follower 18 and the photodiode cathode 14 at the reference voltage 15. Following the opening of reset switch 17, row select switch 22 is opened to place the image acquisition system 300 into an exposure phase. In the exposure phase, an image is sensed by exposing pixel 10 to incident radiation 12. The effect of incident radiation 12 on pixel 10 is to generate photoelectrons which change the voltage on the photodiode cathode 14. In a preferred embodiment the acquisition of incident radiation 12 reduces the voltage across the source follower 18 from the reference voltage 15 set to $V_{pixelbias}$ in the reset phase. Following the exposure phase, the image acquisition system 300 is placed into a readout phase.

Voltage Signal Readout and Linear V-I Conversion

After power to the column processing circuit 105 is turned on by the power switch 52, the clamp 27 drains off excess charge from the gate of the buffer 36 setting $V_{clin}$ to $V_{ss}$ in the preferred embodiment. The gate of the buffer 36 is periodically clamped every row so that it will not drift over time. The clamping operation is required as the first step of the two stage double correlation process to measure correctly both the signal voltage and the reference voltage. Because small amounts of current can cause the voltage on the gate of the buffer 36 to vary over time, it is important to set the level to a predetermined voltage. The micro-controller timing and control circuit 310 causes the clamp 27 to clamp the gate of the buffer 36 $V_{clin}$ as the first step in reading out the voltage signal on the pixel. During the clamping step, the voltage signal of the pixel $V_{col}$, which has been reset and now exposed, appears on the source of row select switch 22 and is propagated to $V_{lvlout}$ gate of the coupling device 26 as described above.

The micro-controller timing and control circuit 310 selects one row at a time by turning on the row select switch 22 for all pixels 10 in the selected row. The clamping step enables a reference current to be generated and stored in the reference current mirror 132. In a preferred embodiment $V_{clamp}$ can be equal to $V_{ss}$, which is approximately zero volts. The voltage on the gate of the level shifter 24 follows the voltage on the photodiode cathode 14 reflecting the signal on the exposed pixel 10. There is 0.6 volt drop across the source follower 18 reducing the voltage signal range to 0.4 volt to 1.4 volts. The level shifter 24 shifts the output voltage level from the active pixel 10 to a higher voltage within the range of 1 to 2 volts. The coupling device 26 is used as a linear capacitor to AC couple the higher voltage from the level shifter 24 to the lower voltage $V_{clin}$ at the gate of the buffer 36. After the active pixel 10 is reset, the voltage appearing on the gate of buffer 36 increases to correctly reflect the voltage signal due to the light exposure incident on the photodiode 11.

The operational signals are shown below where $T_{clamp}$ is the time the clamp is applied and $T_{reset}$ is the time when the pixel 10 is reset. $I_{tclamp}$ is the current stored in the reference current mirror 132 at the time when the gate of the buffer 36 is clamped, at time=$T_{clamp}$. $I_{treset}$ is the current stored in the signal current mirror 130 at the time when the active pixel 10 is reset, time=$T_{reset}$. $V_{ref}$ is the pixel reset reference voltage and $V_{signal}$ is the voltage change on the pixel 10 due to incident ambient light. $V_{lvlout}$ is the voltage on the upper plate of coupling device 26 and $V_{clin}$ is the voltage on the gate of buffer 36.

At time=$T_{clamp}$, clamp 27 is turned on producing the following signals:

$V_{lvlout} = \alpha(V_{ref} - V_{signal})$ where $\alpha$ is the gain of the active pixel 10 and level shifter 24.

$V_{clin} = V_{clamp}$ $I_{tclamp} = \eta(V_{clamp})$ is the offset current stored in the reference current mirror 132, where $\eta$ is the transconductance of the liner V-I Conversion.

The pixel 10 is reset at time=$T_{reset}$ producing the following signals:

$V_{lvlout} = \alpha V_{ref}$ $V_{clin} = V_{clamp} + \alpha V_{signal}$ $I_{treset} = \eta(V_{clamp} + \alpha V_{signal})$ is stored in the signal current mirror 130.

$I_{diffampout} = (I_{treset} - I_{tclamp}) = \eta \alpha(V_{signal})$

In a preferred embodiment $\alpha$=0.8 and $V_{clamp}$=$V_{ss}$. The clamp 27 is turned on and $V_{clin}$ is clamped to the predetermined clamp voltage. The micro-controller timing and control circuit 310 selects the reference current mirror 132 and the reference current value is stored in the reference current mirror 132. When the clamp 27 is turned on, $V_{lvlout}$ a voltage proportional to the reference voltage minus the voltage signal generated by the incident ambient light resides across coupler 26. After storing the reference current, pixel 10 is reset as described above. When the pixel 10 is reset to the higher reference voltage, the voltage on the upper plate of the coupler 26 is pulled up to reflect the higher reference voltage on the pixel and the voltage on the lower plate of coupler 26 $V_{clin}$ is pulled up proportionally to reflect of the signal proportional to the incident ambient light on the pixel 10 during exposure. The buffer 36 generates an output which is communicated to the gate of the linear mode current controlling device 38. The micro-controller timing and control circuit 310 selects the signal current mirror 130. The linear mode current controlling device 38 sinks current from the signal current mirror 130 in an amount that is linearly proportional to the voltage signal from the incident ambient light on the photo diode 11 plus the offset current. The voltage signal $V_{linin}$ at the source of the buffer 36 is applied to the gate of the linear mode current controlling device 38. $V_{linin}$ controls the current flow signal $I_{linout}$ generated by the linear mode current controlling device 38. After the current flow $I_{linout}$ reaches a steady state which requires a few nanoseconds, the current controlled by the linear mode current controlling device 38 representing the signal incident on the active pixel is stored in the signal current mirror. The method of storing a current as a voltage corresponding to current on gate a pMOS transistor in the current mirror is known in the art.

After the signal current plus offset current is stored in the signal current mirror 130, the micro-controller timing and control circuit 310 successively reads out the reference current mirror 132 and signal current mirror 130 for each column as current inputs into a differential output circuit which subtracts out the offset current and produces a contribution to the output signal.

The micro-controller timing and control circuit 310 controls the operation of the signal current mirror 130 and the reference current mirror 132. The signal and reference stored in the current mirrors are read out by turning off the power switch 52 which turns off the column processing circuit 105 followed by scanning the signal current mirror 130 and the reference current mirror 132 simultaneously onto a column readout line. The scanning is repeated three times once for each triplet consisting of a red, green and blue signal line. A different mode of operation of the current mirrors, preferred for certain alternative embodiments is described in greater detail below.

Physical Location of Pixel Voltage Output and Source Follower Load

Figure 5:
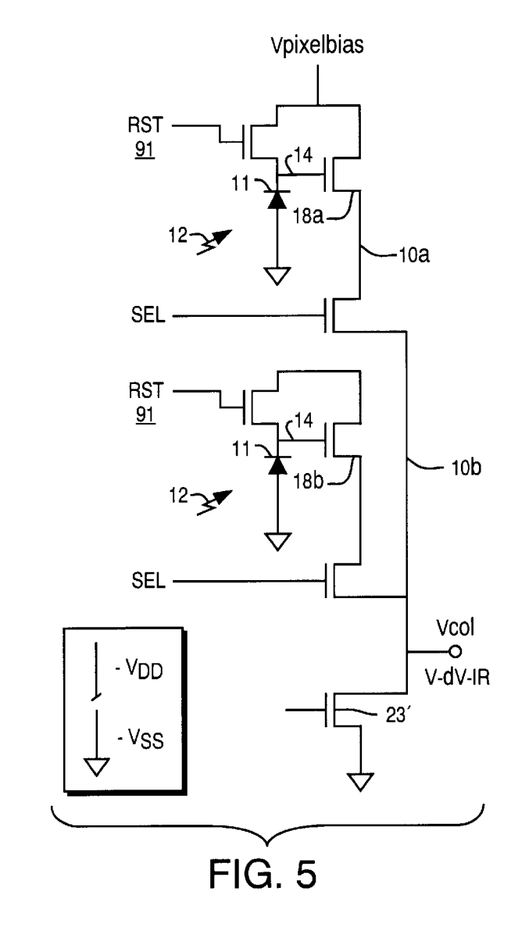
FIG. 5 is a simplified schematic and layout representing an embodiment of the invention including multiple pixels and the load for the source follower in the active pixel showing a row position dependent voltage drop along the column bus.

A source of signal variation from one row to another row is caused by the location of a pixel on the column bus. Referring now to FIG. 5 a typical placement of the source follower load 23' for the source followers 18a, 18b causes a different IR drop for each pixel in a column depending on the physical location of the pixel in a column.

Figure 6:
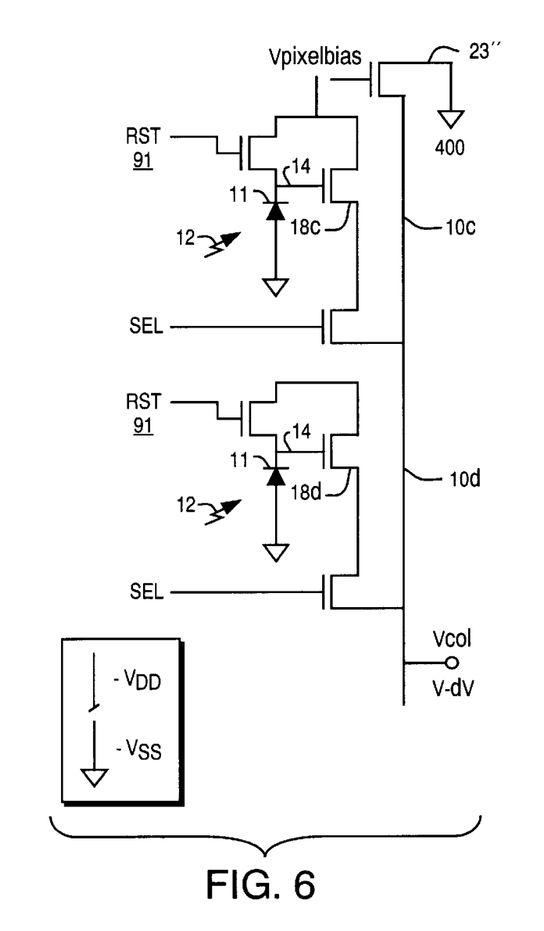
FIG. 6 is a simplified schematic and layout representing an embodiment of the invention including multiple pixels and the load for the source follower in the active pixel in order to reduce the row dependent voltage drop along the column bus.

As shown in FIG. 6, in a preferred embodiment the source follower load 23" for the source followers 18c, 18d is physically placed so there is no current flowing to the voltage output $V_{col}$ of each pixel. The source follower load 23" acts as a bias device connected to a column output bus 400. The input to the level shifter 24 is connected to the output bus 400 and the drain of the source follower load 23".

Although the IR drop in a typical pixel array can be partially removed through correlated double sampling, the layout and method of the present invention minimizes error due to variation voltage drop due to physical location of the pixel.

Current Mirrors with Single Current Output

In an alternate embodiment the signal current mirror 130 and the reference current mirror 132 can be operated to produce a single output which reflects the signal value. In this embodiment the reference value is stored in the reference current mirror 132. When the signal current is flowing through the linear mode current controlling device 38, the reference current mirror 132 is activated resulting in the difference signal being memorized in the signal current mirror 130. When the row is read out, the signal current mirror 130 provides the single current output to the output bus amplifier. The advantage of this method of operation is that the downstream differential output amplifier 160 is not required and there is no problem with imperfect subtraction downstream because the subtraction is performed locally in the current domain in the current mirrors at each individual column.

Linear V-I Conversion with Single Stage Correlated Double Sampling

Figure 7:
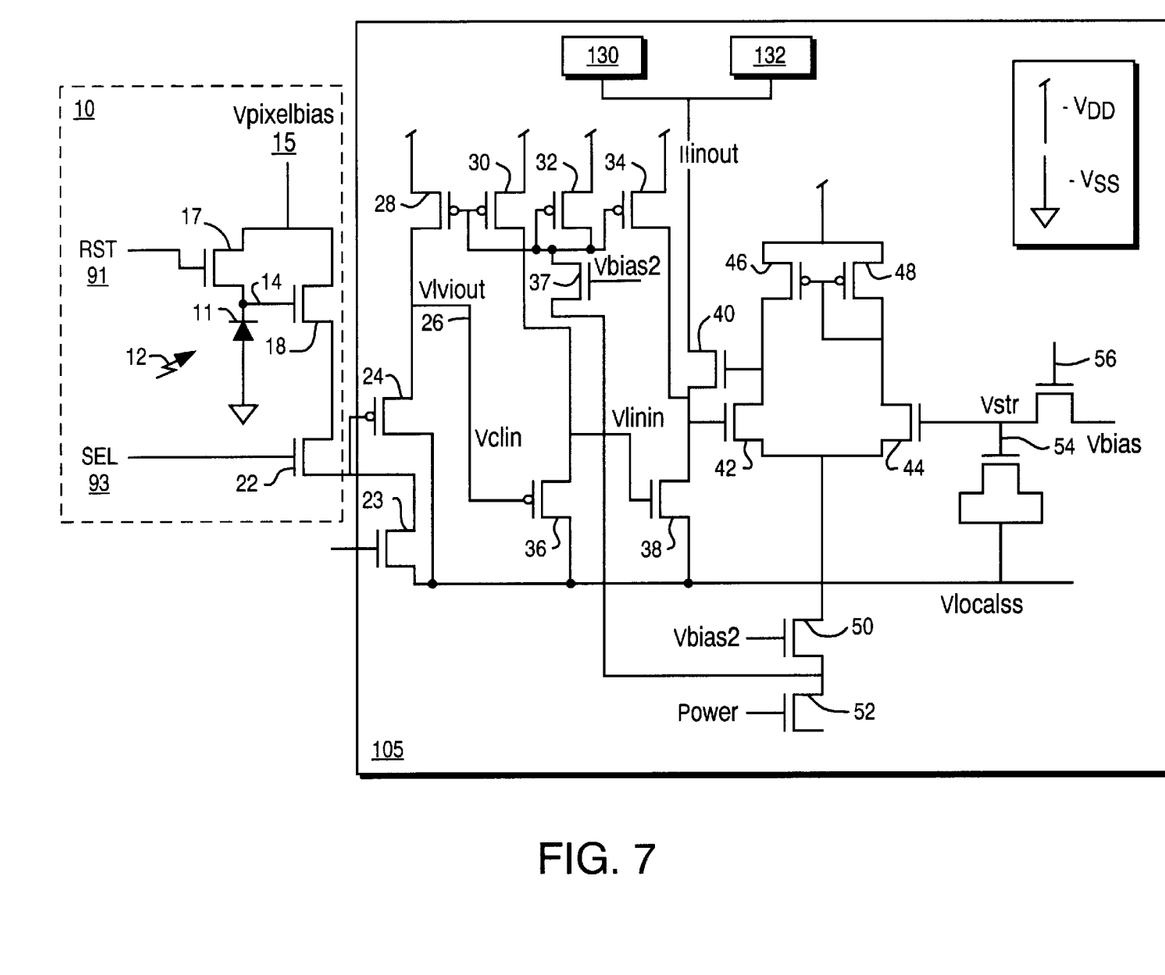
FIG. 7 is a block diagram of an alternate embodiment of an image sensing array according to the present invention including an active pixel and column processing circuitry operating without a clamp and coupling device.

Referring to FIG. 7, showing there is shown another alternate embodiment, in which single stage correlated double sampling can eliminate fixed pattern noise without the coupling device 26 or the clamp 27 shown in FIG. 4. The current flowing through the linear mode current controlling device 38 is proportional to the voltage on the photodiode cathode 14. The a micro-controller timing and control circuit 310 selects the signal current mirror 130 to store a current proportional to the reference voltage minus the signal voltage, resets the pixel 10, and then selects the reference current mirror 132 to store a current proportional to the reference voltage. The micro-controller timing and control circuit 310 controls the conversion of the stored currents signals in the signal current mirror 130 and the reference current mirror 132 into a reference current and a signal current which are communicated via the signal output bus 134 and the reference output bus 136 as a current signals to the inputs of the differential output amplifier 160 to produce an output signal. This alternate embodiment can also be operated can be operated to produce a single output in the signal current mirror 130 which reflects the signal value.

Alternative removable memory/interfaces can include a PCM interface, a parallel port interface or a USB (universal serial bus) interface.

In an alternate embodiment, current mirrors can be formed from either nMOS or pMOS transistors. If nMOS transistors are used, the current mirror mirrors will sink current instead of sourcing current.

In an alternate embodiment all or some of the components of the image acquisition system 300 can be included on a single substrate.

The present invention is advantageously adapted to respond to incident radiation and provide a current signal output exhibiting less fixed-pattern noise than is presently available in conventional CMOS imaging devices. While there have been described herein preferred embodiments of the present invention, it will be readily apparent to those skilled in the relevant art that various changes and modifications may be made therein without departing from the scope of the invention, and it is intended in the wording of the appended claims to include such changes and modifications as would be encompassed by the true spirit and teachings of the invention. As will be appreciated by those skilled in the relevant art, the embodiments described are not meant to be interpreted in a limiting sense.

What is claimed is:

1. A method for converting an output voltage from an active pixel in a solid-state image sensing device into a current comprising the steps of:

providing a bias voltage for biasing a linear mode current controlling device into a linear mode;

shifting the output voltage level on an input to a voltage shifting device to a higher voltage;

periodically clamping an input to a buffer device to a predetermined clamp voltage;

coupling said higher voltage to the buffer device;

generating an output signal from said buffer device for controlling said linear mode current controlling device; and generating a current signal flowing through said linear mode current controlling device which is indicative of the output voltage from the active pixel.

2. The method as recited in claim 1 further comprising the step of reducing a change of voltage output as a function of relative distance of the active pixel to said input of said voltage shifting device.

3. The method as recited in claim 1 further comprising the step of maintaining linear mode operation of a plurality of said linear mode current controlling devices connected to a common voltage source bus while in the presence of a voltage change along a voltage supply bus.

4. The method as recited in claim 1 further comprising the step of storing the current signal in a current mirror circuit.

5. The method as recited in claim 1 further comprising the steps of:

storing a first current in a first current mirror circuit, said first current provided from said predetermined clamp voltage;

storing a second current in a second current mirror circuit, said second current provided from said active pixel receiving ambient light; and providing a difference signal in response to an output of the first current mirror circuit and an output of the second current mirror circuit.

6. The method as recited in claim 5 where providing a difference signal between an output of the first current mirror circuit and the output of the second current mirror circuit further comprises the steps of:

providing the first current signal from the first current mirror through a signal output bus into a current based differential circuit; and providing the second current signal from the second current mirror through a reference output bus into the current based differential circuit.

7. The method as recited in claim 1 further comprising the steps of:

storing a first current in a first current mirror circuit, said first current storing a first current in a first current mirror circuit, said first current provided from said predetermined clamp voltage;

storing a difference current in a second current mirror circuit while activating said first current mirror circuit, said difference current provided from the difference between said active pixel receiving ambient light and said first current; and reading out said difference current.

8. A method for converting an output voltage from an active pixel in a solid-state image sensing device into a current comprising the steps of:

provinding a bias voltage for biasing a linear mode current controlling device into a linear mode;

shifting the output voltage level from an input of a voltage shifting device to a higher voltage onto an input of a buffer device;

generating an output signal from said buffer device for controlling said linear mode current controlling device; and generating a current signal flowing through said linear mode current controlling device which is indicative of the output voltage from the active pixel.

9. The method as recited in claim 8 further comprising the step of reducing a change of voltage output as a function of relative distance of the active pixel to said input of said voltage shifting device.

10. The method as recited in claim 8 further comprising the step of maintaining linear mode operation of a plurality of said linear mode current controlling devices connected to a common voltage source bus while in the presence of a voltage change along a voltage supply bus.

11. The method as recited in claim 8 further comprising the step of storing said signal current in a current mirror circuit.

12. The method as recited in claim 8 further comprising the steps of:

storing a first current in a first current mirror circuit, said first current provided from said active pixel receiving ambient light;

storing a second current in a second current mirror circuit, said second current provided from said active pixel shielded from ambient light; and providing a difference signal in response to an output of the first current mirror circuit and an output of the second current mirror circuit.

13. The method as recited in claim 12 where providing a difference signal between an output of the first current mirror circuit and the output of the second current mirror circuit further comprising the steps of:

providing the first current signal from the first current mirror through a signal output bus into a current based differential circuit; and providing the second current signal from the second current mirror through a reference output bus into the current based differential circuit.

14. The method as recited in claim 8 further comprising the steps of:

storing a first current in a first current mirror circuit, said first current provided from said predetermined clamp voltage;

storing a difference current in a second current mirror circuit while activating said first current mirror circuit, said difference current provided from the difference between said active pixel receiving ambient light and said first current; and reading out said difference current.

15. A solid-state imaging device comprising:

a plurality of active pixels arranged in rows and columns, each pixel producing an output voltage;

a level shifter connected one row at a time to the output from the active pixel;

a coupling device connected to output of said level shifter;

a buffer having an input and an output connected to said coupling device;

a clamp connected to the input of the buffer;

a linear mode current controlling device connected to the output of the buffer; and a current source which provides bias current to said linear mode current device.

16. The solid-state imaging device as recited in claim 15 further comprising:

a bias device connected to a column output bus; and an input to the level shifter connected to the output bus where the pixel output voltage is connected to the column output bus between the bias device and the input to the level shifter.

17. The solid-state imaging device as recited in claim 15 further comprising:

a bus providing a voltage source to one row at a time; and means for maintaining a biasing voltage across the linear mode current controlling device in the presence of a voltage drop along the bus.

18. The solid-state imaging device as recited in claim 15 wherein each of said linear mode current controlling device, buffer, and level shifter is a CMOS transistor.

19. A solid-state imaging device comprising:

a plurality of active pixels arranged in rows and columns, each pixel producing an output voltage;

a level shifter connected one row at a time to the output from the active pixel;

a buffer connected to output of said level shifter and having an output;

a linear mode current controlling device connected to said output of the buffer; and a current source which provides bias current to said linear mode current device.

20. The solid-state imaging device as recited in claim 19 further comprising:

a bias device connected to a column output bus; and an input to the level shifter connected to the output bus where the pixel output voltage is connected to the column output bus between the bias device and the input to the level shifter.

21. The solid-state imaging device as recited in claim 19 further comprising:

a bus providing a voltage source to one row at a time; and means for maintaining a biasing voltage across the linear mode current controlling device in the presence of a voltage drop along the bus.

22. The solid-state imaging device as recited in claim 19 wherein each of said linear mode current controlling device, buffer, and level shifter is a CMOS transistor.

* * * * *